(12) United States Patent
Farnsworth

(10) Patent No.: US 7,684,788 B2
(45) Date of Patent: Mar. 23, 2010

(54) METHOD AND APPARATUS FOR PROCESSING MESSAGES RECEIVED BY A DEVICE FROM A NETWORK

(75) Inventor: Andrew John Farnsworth, Bromsgrove (GB)

(73) Assignee: M-Stack Limited, Birmingham (GB)

( * ) Notice: Subject to any disclaimer, the term of this patent is extended or adjusted under 35 U.S.C. 154(b) by 77 days.

(21) Appl. No.: 10/673,810

(22) Filed: Sep. 29, 2003

(65) Prior Publication Data

US 2005/0070252 A1   Mar. 31, 2005

(51) Int. Cl.
    *H04M 11/00*   (2006.01)
(52) U.S. Cl. .............. 455/412.1; 455/403; 455/445; 455/522; 455/500
(58) Field of Classification Search .......... 455/450, 455/411, 500, 517, 436, 405, 445, 560, 406, 455/434, 403, 552.1, 426.1, 432.1, 425, 435, 455/412.1, 522, 422, 415.1; 370/350, 503, 370/260, 352, 400, 338
See application file for complete search history.

(56) References Cited

U.S. PATENT DOCUMENTS

| 6,782,274 | B1 * | 8/2004 | Park et al. ................ 455/552.1 |
| 6,792,270 | B1 * | 9/2004 | Neumann ................. 455/432.1 |
| 6,826,406 | B1 * | 11/2004 | Vialen et al. ................ 455/450 |
| 6,850,759 | B2 * | 2/2005 | Van Lieshout et al. ... 455/426.1 |
| 6,898,429 | B1 * | 5/2005 | Vialen et al. ............. 455/432.1 |
| 2002/0115460 | A1 * | 8/2002 | Rune et al. .................. 455/522 |
| 2002/0142749 | A1 * | 10/2002 | Muniere et al. ............. 455/403 |
| 2003/0012149 | A1 * | 1/2003 | Maggenti et al. ............ 370/260 |
| 2003/0050097 | A1 * | 3/2003 | Amirijoo et al. ............ 455/560 |
| 2003/0104801 | A1 * | 6/2003 | Koulakiotis et al. ......... 455/406 |
| 2003/0119533 | A1 * | 6/2003 | Sarkkinen et al. ........... 455/500 |
| 2003/0171129 | A1 * | 9/2003 | Sagne ........................ 455/517 |
| 2003/0210676 | A1 * | 11/2003 | Wu .............................. 370/350 |
| 2003/0210714 | A1 * | 11/2003 | Wu .............................. 370/503 |
| 2003/0211846 | A1 * | 11/2003 | Nagpal et al. ............... 455/434 |
| 2003/0235212 | A1 * | 12/2003 | Kuo ........................... 370/503 |
| 2003/0236085 | A1 * | 12/2003 | Ho ............................. 455/411 |
| 2004/0053597 | A1 * | 3/2004 | Agin .......................... 455/405 |
| 2004/0203778 | A1 * | 10/2004 | Kuo et al. .................... 455/436 |
| 2004/0203971 | A1 * | 10/2004 | Kuo ............................ 455/517 |
| 2005/0009527 | A1 * | 1/2005 | Sharma ....................... 455/445 |

\* cited by examiner

*Primary Examiner*—Charles N Appiah
*Assistant Examiner*—Michael T Vu

(57) ABSTRACT

A method and apparatus for processing messages received by a device from a network. The method comprises receiving a message that indicates that the device should be in a dedicated channel state (such as Cell_DCH), wherein the message is a message other than a reconfiguration message (e.g. CUC) and, in response to the message, clearing from the device any record of a cell identifier (C_RNTI).

9 Claims, 6 Drawing Sheets

METHOD AND APPARATUS FOR PROCESSING MESSAGES RECEIVED BY A DEVICE FROM A NETWORK

FIELD OF THE INVENTION

The present invention relates to the field of telecommunications and particularly to the area of wireless telecommunication systems.

BACKGROUND OF THE INVENTION

In a typical cellular radio system, mobile user equipment (UE) communicates via a radio access radio network (RAN) to one or more core networks. User equipment (UEs) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

An example of a radio access network is the Universal Mobile Telecommunications System (UMTS) Terrestrial Radio Access Network (UTRAN). UMTS is a third generation mobile communication system and essentially relates to a wide band code division multiple access (W-CDMA) system.

W-CDMA technology allows simultaneous communication between user equipment and a plurality of base stations using a common frequency band. Signals occupying a common frequency band are discriminated in the receiving base station through spread spectrum CDMA waveform properties based on the use of a high speed, pseudo-noise (PN) code. These high speed PN codes are used to modulate signals transmitted from the base stations and the user equipment. A transmitting station uses a PN code to produce signals that can be separately demodulated at a receiving station. In CDMA therefore a user equipment unit need not switch frequency when handover of the connection is made from one cell to another. Thus, a destination cell can support a connection to the user equipment at the same time as the original cell continues to provide service. Since the UE is always communicating through at least one cell during hand over, there is no disruption to the call.

There are several interfaces defined in the UTRAN. In some instances a connection involves both a serving or source RNC (SRNC) and a target or drift RNC (DRNC), with the SRNC controlling the connection but with one or more diversity legs of the connection being handled by the DRNC. UMTS has both common transport channels and dedicated transport channels. Common transport channels include the random access channels (RACH), the forward access channel (FACH), the common packet channel (CPCH) and the downlink shared channel (DSCH). Dedicated transport channels include the dedicated channel (DCH). These transport channels are described for example in one or more of the following specifications:

ETSI TS 125.211 Version 3.12.0 "Physical Channels and Mapping of Transport Channels on to Physical Channel (FDD)";

ETSI TS 125.221 Version 3.11.0 "Physical Channels and Mapping of Transport Channels on to Physical Channel (TDD)";

ETSI TS 125.331 Version 3.15.0 "Radio Resource Control (RRC) Protocol Specification.

When switching from a dedicated to a common channel in UMTS, the UE is assigned a temporary identifier known as C-RNTI (Cell Radio Network Temporary Identifier). This temporary identifier C-RNTI is specific to a cell and is valid in the cell where the UE uses resources. The C-RNTI is used to distinguish between different user equipment in that cell.

When switching from dedicated channels to common channels, the network can assign the radio resources to be used only if the UE is in a cell under control of the serving SNC (SRNC). In other words, if the UE is in a cell under the control of a drift RNC (DRNC) rather than SRNC, it is not possible for the network to assign the radio resources to be used when switching from dedicated channels to common channels. This results in longer signalling sequences between the UE and the network as well as additional delay when switching from dedicated channels to common channels. The UE itself must obtain the temporary identifier C-RNTI by additionally signalling between the UE and UTRAN before continuing to communicate with the network. Furthermore, the lack of information regarding which range of resources to use means that the UE needs to detect and read information about the range of resources and the broadcast channel in the cell before accessing the cell. This again incurs additionally delay when switching from dedicated channels to common channels.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for processing a message received by a device from a network is described. In the following description, for the purposes of explanation, numerous specific details are set forth in order to provide a thorough understanding of the present invention. It will be apparent, however, to one skilled in the art that the present invention may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for processing messages received by a device from a network. The method comprises receiving a message that indicates that the device should move into a dedicated channel state (such as Cell_DCH), wherein the message is a message other than a reconfiguration message. On receipt of such a message (e.g. a Cell Update Confirm message or a RRC Connection Setup message) and before moving to the dedicated channel state, the device clears any record of a cell identifier.

The following are reconfiguration messages: Radio Bearer Setup message, Radio Bearer Reconfiguration message, Radio Bearer Release message, Transport Channel Reconfiguration message or Physical Channel Reconfiguration message.

In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices.

Figure 1:
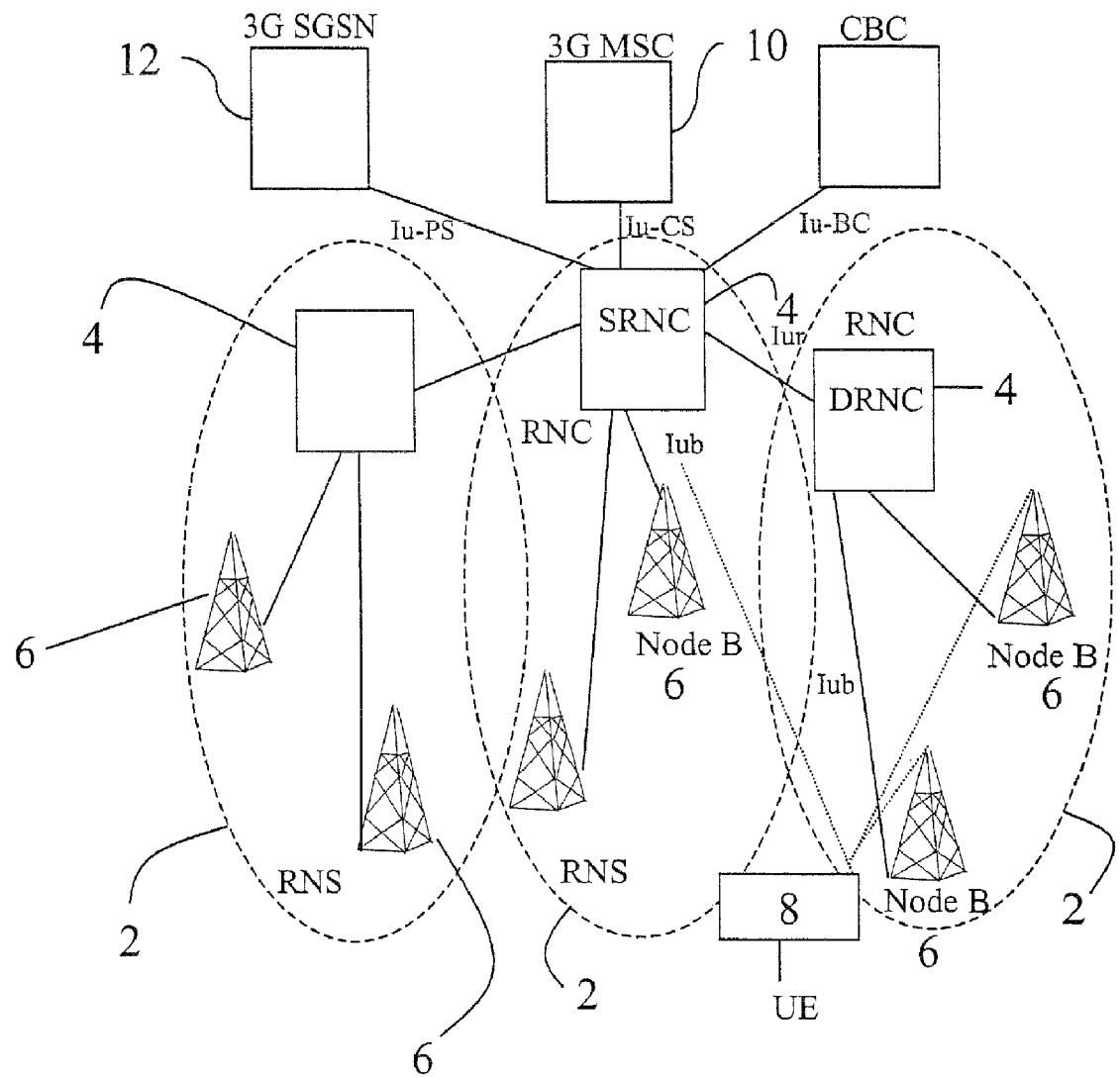
FIG. 1 shows a schematic diagram of a radio access network system.

FIG. 1 shows an overview of the radio access network (UTRAN) used in a UMTS system. The network as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 8 may be mobile within the radio access network. Radio connections (indicated by the straight dotted lines in FIG. 1) are established between the UE and one or more of the Node Bs in the UTRAN.

The radio network controller controls the use and reliability of the radio resources within the RNS. Each RNC is also connected to a 3G mobile switching centre 10 (3G MSC) and a 3G serving GPRS support node 12 (3G SGSN).

An RNC controls one or more Node B's. An RNC plus its Node B's together make up an RNS. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link.

C-RNTI, the Cell Radio Network Temporary Identity, is a UE identifier allocated by the controlling RNC and it is unique within one cell controlled by the allocating CRNC. C-RNTI can be reallocated when a UE accesses a new cell with a cell update procedure. C-RNTI is used as a UE identifier in DCCH/DTCH common channel messages on the radio interface.

Figure 2:
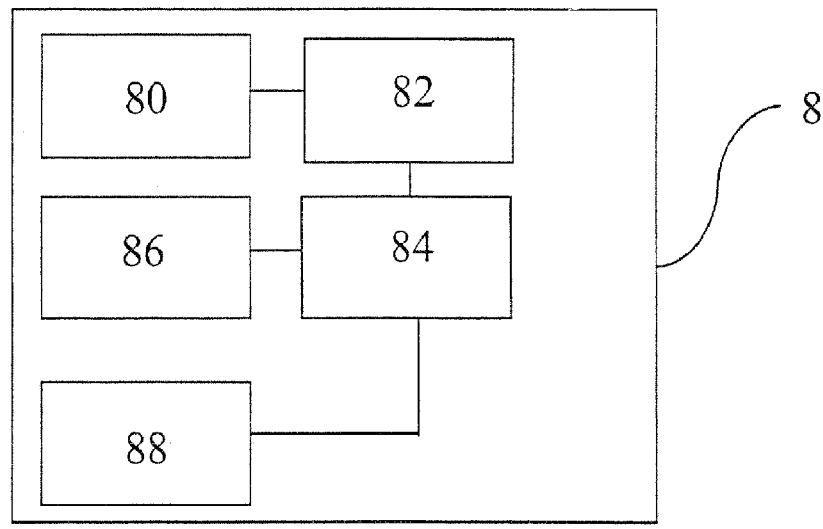
FIG. 2 shows the components of a user equipment used with the radio access network system of FIG. 1.

FIG. 2 shows a schematic diagram of various components of UMTS user equipment. The UE 8 includes an antenna 80 and a transceiver 82 for transmitting and receiving radio signals. In the Time Division Duplux (TDD) mode of UMTS, the transceiver 82 may use a rake receiver to establish the signal to be operated on by the UE. The transceiver 82 is connected to a processor 84 which processes the signals received by and sent by the transceiver. The processor 84 has connections to memory 86 and a user interface device 88 (such as a keyboard and/or a screen). FIG. 2 only shows the main components of the UE. Clearly the UE will include other components which are not shown but which are not relevant for the present understanding.

Figure 3:
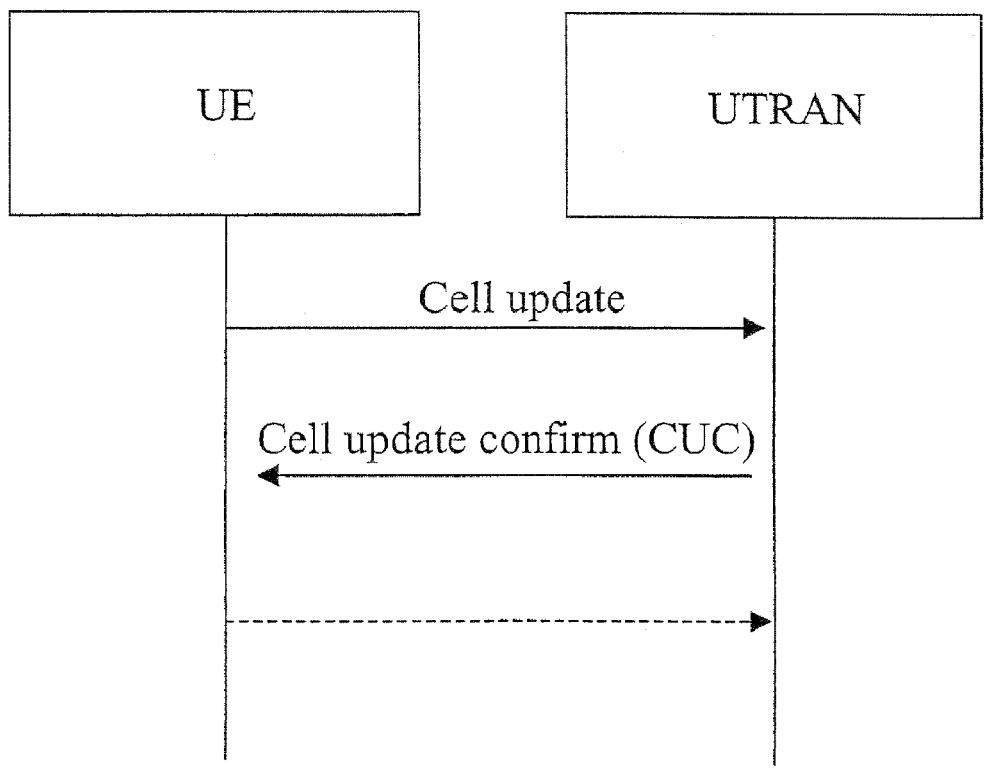
FIG. 3 illustrates the cell update procedure used with a radio access network system as shown in FIG. 1.

FIG. 3 shows the cell update procedure in UMTS. Firstly the UE sends a cell update to the UTRAN. ETSI TS 125.331 Version 03.15.00 Section 8.3.1.5 describes what occurs at the UTRAN when the UTRAN receives a cell update message from a UE. Among other things, the UTRAN transmits a cell update confirm (CUC) message. ETSI TS 125.331 Version 03.15.00 Section 8.3.1.6 describes the operation of the UE on reception of a cell update confirm message from the UTRAN. The UE may, in response, send a Physical or Transport Channel Configuration Complete message or any other suitable message or possibly no response message.

In UMTS, cell radio network temporary identifiers (C_RNTIs) are allocated by each cell in the UTRAN to each user equipment (UE) that is in the cell and is in Cell_FACH. When the UE leaves Cell_FACH or leaves the cell, the C-RNTI is no longer required by the UE.

Figure 4:
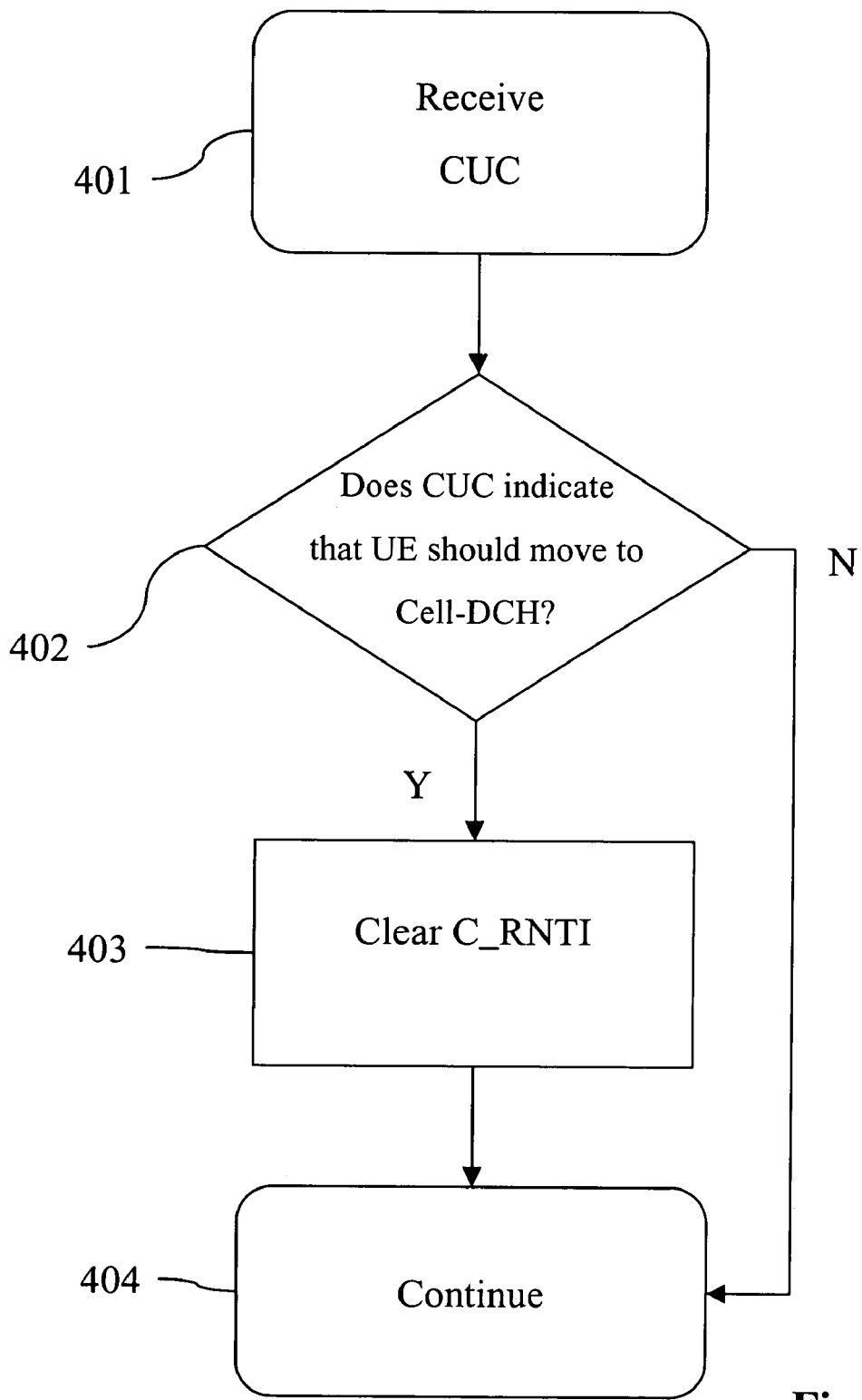
FIG. 4 is a flow chart illustrating the operation of a first embodiment of a system.

FIG. 4 illustrates the operation of a first embodiment of the proposed method in which the C-RNTI is cleared when entering Cell_DCH on receipt of a message other than a reconfiguration message. When a UE receives a cell update confirm message (step 401) the UE determines (step 402) whether the CUC message indicates that the UE should move to the state Cell_DCH. If the cell update confirm message indicates that the UE should move from Cell_FACH to Cell_DCH, the UE clears the C_RNTI variable (step 403) existing in the UE. The device then continues (step 404) with other processes. If the CUC message does not indicate that the UE should move from Cell_FACH to Cell_DCH then the UE continues (step 404) with other processes.

A similar process may be carried out on receipt of a URA Update Confirm Message.

ETSI Standard TS 125.331 version 3.15.0 (and other similar CDMA standards) may be amended to implement these proposals.

For instance section 8.1.3.6 of the above standard may be amended as follows. On reception of a cell update confirmation/URA update confirm message by the UE:

---

If the UE after state transition enters CELL__DCH state, it shall:
    1> in FDD; or
    1> in TDD when "Primary CCPCH Info" is included indicating a
    new target cell and "New C-RNTI" is not specified:
        2> remove any C-RNTI from MAC;
        2> clear the variable C__RNTI.

---

Figure 5:
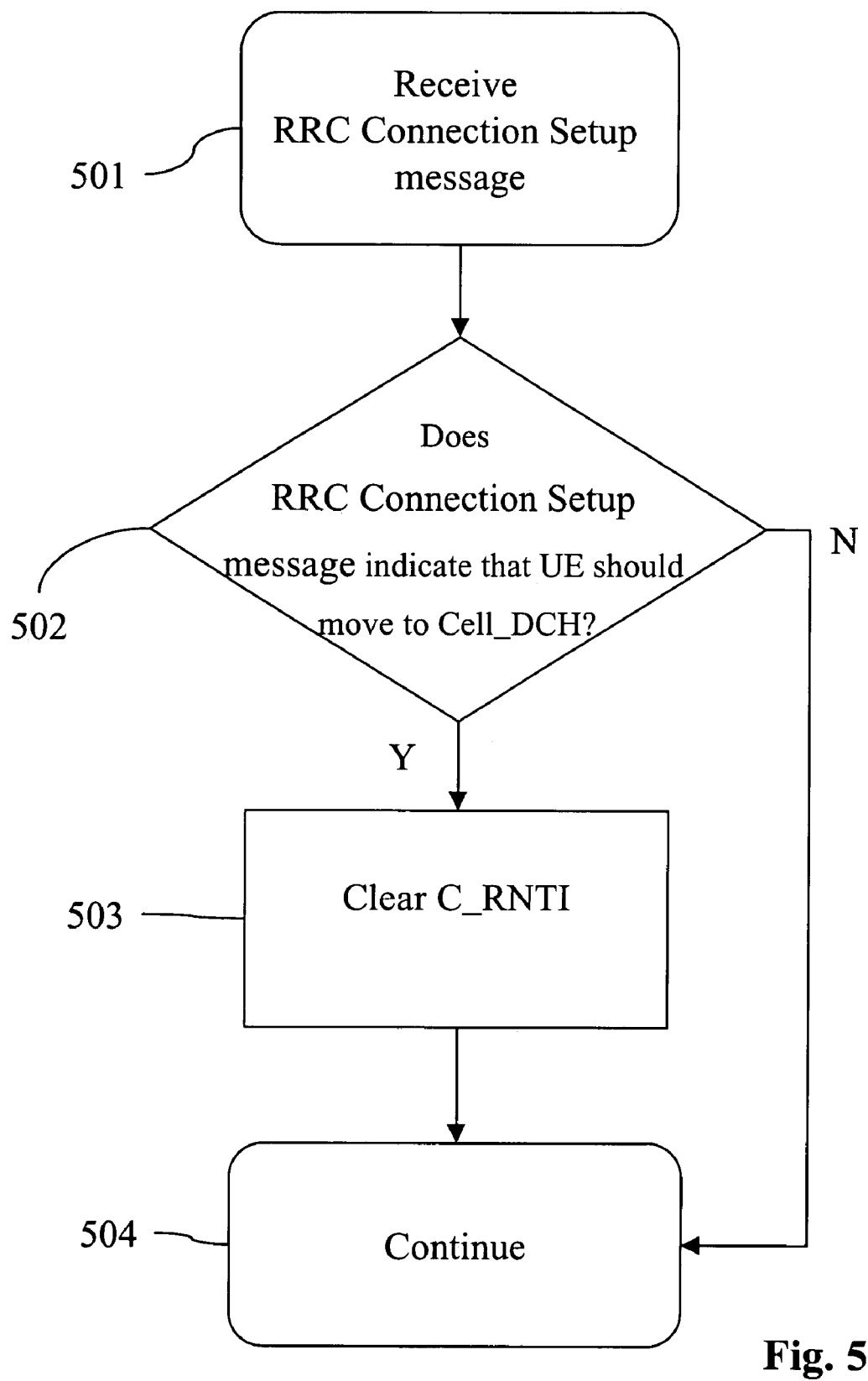
FIG. 5 is a flow chart illustrating the operation of a second embodiment of a system.

FIG. 5 illustrates a second embodiment of the proposed method in which the C-RNTI is cleared when entering Cell_DCH. This time the non-reconfiguration message being considered is a RRC Connection Setup message. When a UE receives a RRC Connection Setup message from the network (step 501), the UE determines (step 502) whether the RRC Connection Setup message indicates that the UE should move to the state Cell_DCH. If the RRC Connection Setup message indicates that the UE should move to Cell_DCH the UE clears the C_RNTI variable (step 503) existing in the UE. The device then continues (step 504) with other processes. If the RRC Connection Setup message does not indicate that the UE should move to Cell_DCH then the UE continues (step 304) with other processes.

ETSI Standard TS 125.331 version 3.15.0 (and other similar CDMA standards) may be amended to implement these proposals.

For instance, section 8.1.3.6 of this standard, and in particular the part which relates to the reception of a "RRC connection setup message by the UE", may be amended as follows:

---

1> if the UE, according to subclause 8.6.3.3, will be in the CELL_DCH state at the conclusion of this procedure:
    2> in FDD; or
    2> in TDD when "Primary CCPCH Info" is included indicating a new target cell and "New C-RNTI" is not specified:
        3> remove any C-RNTI from MAC;
        3> clear the variable C_RNTI.

---

Thus the UE removes the C-RNTI when entering CELL_DCH so that the UE and the network do not end up with different C-RNTIs if the UE enters CELL_FACH state and uses a stored C-RNTI. This prevents the UE from entering CELL_FACH with the CELL C-RNTI which may belong to a different UE and therefore prevents the UE capturing messages intended for another UE.

Figure 6:
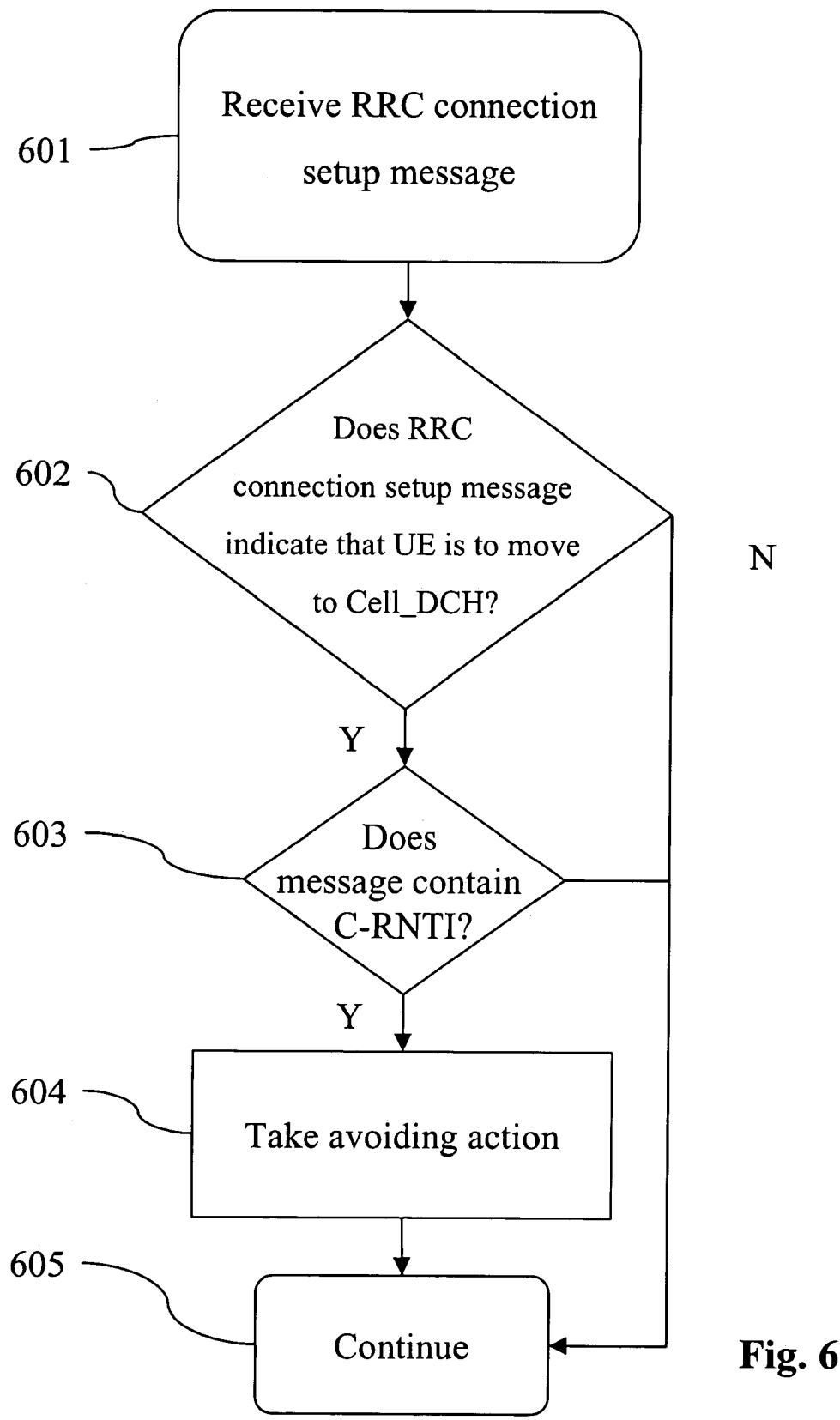
FIG. 6 is a flow chart illustrating the operation of a third embodiment of the system.

FIG. 6 is a flow chart showing the operation of a further embodiment. This relates to the situation in which a message other than a reconfiguration message is received which both moves the UE to Cell_DCH and also includes a cell identifier in the received message. In this embodiment an RRC connection setup message is received (step 601). The UE then checks whether the message instructs the UE to move to Cell_DCH (step 602). If the RRC connection setup message includes such an indicator, the UE then checks whether the message includes a C_RNTI (step 603). If so, the UE then takes avoiding action (step 604). Examples of such an avoiding action are that the UE rejects such a message as invalid; ignores such a message; moves to Cell_DCH but ignores the C_RNTI; moves to Cell_FACH and ignores the Cell_DCH state indicator; or takes another action to ensure that it is not in Cell_DCH with a C_RNTI stored. The device then continues (step 605) with other processes.

Thus this embodiment provides a method of processing messages received by a device from a network. The method comprises receiving a message that indicates that the device should move into a dedicated channel state, wherein the message is a message other than a reconfiguration message and includes a cell identifier. Before moving to the dedicated channel state, the device takes further action to deal with the cell identifier in the received message.

Figure 7:
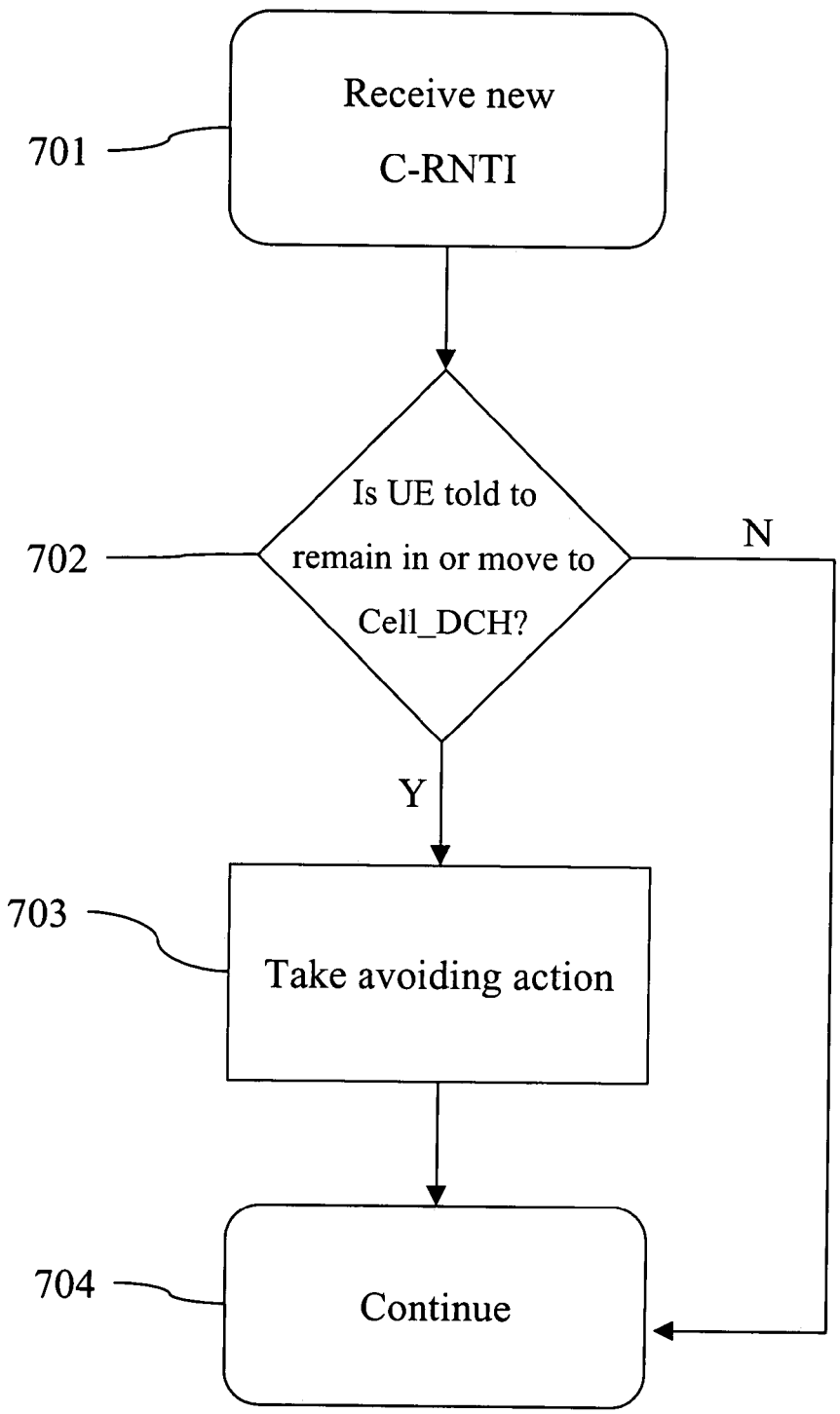
FIG. 7 is a flow chart illustrating the operation of a fourth embodiment of the system.

FIG. 7 is a flow chart showing the operation of a further embodiment of the operation of a UE. Similarly to the embodiment illustrated by FIG. 6, in FIG. 7, it is shown that when a new C-RNTI is received which means that the UE will remain in or transition to Cell_DCH, then some action is taken to avoid being in Cell_DCH with a C-RNTI stored in the C_RNTI variable. Thus on receipt of a new C-RNTI (step 701) the message in which the C-RNTI is included is examined to see if the message tells the UE to remain in or transition to Cell_DCH. If it does, the UE takes avoiding action (step 703). If it does not, then the UE may continue with other processes (step 704) which will not be discussed further. Examples of avoiding action are that the UE should reject such a message as invalid; should ignore such a message; should remain in (or transition to) Cell_DCH but ignore the C_RNTI; move to Cell_FACH if required and perform Cell_UPDATE; or should take some other action to ensure that it is not in Cell_DCH with a C_RNTI. The device then continues (step 704) with other processes.

Such operations in particular are applicable to Section 8.6.3.9 of ETSI TS 125.331 Version 3.15.0.

Thus the UE is able to manage messages, other than reconfiguration messages, when entering Cell_DCH.

It is to be noted that the methods as described have shown steps being carried out in a particular order. However, it would be clear to a person skilled in the art that the order of the evaluation is immaterial with respect to the operation of the method. For instance, the device may check in any order whether a C-RNTI is included in the message or whether the message moves the UE into Cell_DCH. The ordering of the steps as described herein is not intended to be limiting.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Any features as claimed may be used in combination or separately.

I claim:

1. A method of processing messages received by a-User Equipment (UE), the UE configurable to be operable in a cellular network, the method comprising:
    receiving one of the following messages: a Cell Update Confirm message; or, a Universal Mobile Telecommunication System Terrestrial Access Network Registration Area, Update Confirm message; or, a Radio Resource Control Connection setup message;
    clearing from the UE any record of a cell identifier that at least temporarily identifies a cell on receipt of one of the messages received during said receiving, and, if the received message includes a new cell identifier, not storing the included cell identifier in the UE;
    moving to a dedicated channel state; and
    optionally sending a response message configured to be receivable by the network after the UE is cleared of any record of a cell identifier.

2. A method according to claim 1 wherein the dedicated channel is a Cell_DCH channel.

3. A method according to claim 1 wherein the cell identifier is a Cell Radio Network Temporary Identifier.

4. A User Equipment (UE) device, the UE configurable to be operable in a cellular network, the UE comprising:
    a memory and a processor configurable to:
    receive one of the following messages: a Cell Update Confirm message; or, a Universal Mobile Telecommunication System Terrestrial Access Network Registration Area, Update Confirm message; or, a Radio Resource Control Connection setup message;
    clear from the memory any record of a cell identifier that at least temporarily identifies a cell or receipt of a received message, and, if the received message includes a new cell identifier, not storing the included cell identifier in the memory;
    move to a dedicated channel state; and
    send, optionally, a response message configured to be receivable by the network after memory is cleared of any record of a cell identifier.

5. The UE of claim 4 wherein the dedicated channel is a Cell_DCH channel.

6. The UE of claim 4 wherein the cell identifier is a Cell Radio Network Temporary Identifier.

7. A method of processing messages received by a User Equipment (UE), the UE configurable to be operable in a cellular network, the method comprising:
    receiving one of the following messages: a Cell Update Confirm message; or, a Universal Mobile Telecommunication System Terrestrial Access Network Registration Area, Update Confirm message; or, a Radio Resource Control Connection setup message;

clearing from the UE any record of a cell identifier that at least temporarily identifies a cell on receipt of a received message, and, if the received message includes a new cell identifier, ignoring the included cell identifier;

moving to a dedicated channel state; and optionally sending a response message configured to be receivable by the network after said clearing.

8. A method according to claim 7 wherein the dedicated channel is a Cell_DCH channel.

9. A method according to claim 7 wherein the cell identifier that at least temporarily identities the cell comprises a Cell Network Temporary Identifier.

* * * * *